(12) United States Patent
Burn

(10) Patent No.: US 8,178,456 B2
(45) Date of Patent: May 15, 2012

(54) SINTERED DIELECTRIC CERAMIC, COMPOSITION FOR MAKING, AND USE THEREOF IN MULTILAYER CAPACITOR AND ENERGY STORAGE DEVICE

(75) Inventor: Ian Burn, Hockessin, DE (US)

(73) Assignee: Ian Burn Consulting, Inc., Hockessin, DE (US)

( * ) Notice: Subject to any disclaimer, the term of this patent is extended or adjusted under 35 U.S.C. 154(b) by 821 days.

(21) Appl. No.: 12/169,254

(22) Filed: Jul. 8, 2008

(65) Prior Publication Data
US 2010/0008019 A1 Jan. 14, 2010

(51) Int. Cl.
*C04B 35/465* (2006.01)
*C04B 35/47* (2006.01)
*H01G 4/06* (2006.01)

(52) U.S. Cl. ...................... 501/136; 361/321.4
(58) Field of Classification Search .................. 501/136; 361/321.4
See application file for complete search history.

(56) References Cited

U.S. PATENT DOCUMENTS

| | | | |
|---|---|---|---|
| 3,951,873 A | | 4/1976 | Kikuchi et al. |
| 4,397,886 A | * | 8/1983 | Neirman et al. .............. 427/80 |
| 4,405,478 A | * | 9/1983 | Murase et al. ........ 252/62.3 BT |
| 4,405,479 A | * | 9/1983 | Murase et al. ........ 252/62.3 BT |
| 4,405,480 A | * | 9/1983 | Murase et al. ........ 252/62.3 BT |
| 4,781,859 A | * | 11/1988 | Noi ........................ 252/519.12 |
| 4,845,062 A | | 7/1989 | Burn |
| 5,195,019 A | | 3/1993 | Hertz |
| 5,486,277 A | | 1/1996 | Barbee et al. |
| 6,329,311 B1 | * | 12/2001 | Fujii et al. ..................... 501/136 |
| 6,627,570 B2 | * | 9/2003 | Fukui et al. .................... 501/136 |
| 6,656,863 B2 | * | 12/2003 | Fukui et al. .................... 501/136 |
| 6,690,567 B1 | | 2/2004 | Lawless et al. |
| 6,933,256 B2 | * | 8/2005 | Fukui et al. .................... 501/136 |
| 7,033,406 B2 | | 4/2006 | Weir et al. |
| 7,157,396 B2 | * | 1/2007 | Watanabe et al. ............. 501/135 |
| 7,265,072 B2 | * | 9/2007 | Watanabe et al. ............. 501/136 |
| 7,799,718 B2 | * | 9/2010 | Kakuda et al. ................ 501/136 |
| 2004/0220043 A1 | * | 11/2004 | Fukui et al. .................... 501/136 |
| 2006/0120020 A1 | | 6/2006 | Dowgiallo |
| 2006/0234853 A1 | * | 10/2006 | Sasaki et al. .................. 501/136 |
| 2008/0254968 A1 | * | 10/2008 | Kakuda et al. ................ 501/137 |

FOREIGN PATENT DOCUMENTS

| | | | |
|---|---|---|---|
| JP | 04144961 | * | 5/1992 |
| JP | 08203767 | * | 8/1996 |

OTHER PUBLICATIONS

Burn et al., Journal of Materials Science, "Energy Storage in Ceramic Dielectrics", vol. 7, pp. 339-343, (1972).

\* cited by examiner

*Primary Examiner* — Karl Group
(74) *Attorney, Agent, or Firm* — Wood, Herron & Evans, LLP

(57) ABSTRACT

A batch powder composition for preparing a non-ferroelectric, sintered dielectric ceramic; a multilayer ceramic capacitor thereof; and an energy storage device. The batch powder contains a titanate powder of at least one of $CaTiO_3$, $SrTiO_3$, or $Ca_xSr_{1-x}TiO_3$ where x=0 to 1, and an acceptor additive. A sintering aid and a donor additive also may be present in the batch powder. The batch powder may be sintered at temperatures of about 1050° C. or less. The ceramic contains a titanate from the titanate powder, the acceptor additive, and the optional sintering aids and donor additive. The multilayer ceramic capacitor is made of the sintered dielectric ceramic and may have electrodes of copper or a copper-nickel alloy. An energy storage device has electrical connections connected to the electrodes of the multilayer ceramic capacitor. The electrical connections may be in electrical communication with additional multilayer ceramic capacitors.

33 Claims, 1 Drawing Sheet

SINTERED DIELECTRIC CERAMIC, COMPOSITION FOR MAKING, AND USE THEREOF IN MULTILAYER CAPACITOR AND ENERGY STORAGE DEVICE

FIELD OF THE INVENTION

This invention relates to ceramic dielectric compositions, and in particular, to calcium and/or strontium titanate compositions for use in multilayer capacitors and energy storage devices.

BACKGROUND OF THE INVENTION

A demand exists for devices that store large amounts of electrical energy. For example, the advent of the electric vehicle, development of fuel cells, applications in space exploration and in the military, to name only a few, are driving the demand for these devices. One type of electrical energy storage device is the ceramic capacitor.

Capacitors are reliable power sources for many applications, and the most common applications are in electronics. However, ceramic capacitors may replace more conventional energy storage devices in applications outside of the electronics market. For example, large banks of multilayer ceramic capacitors can replace lead-acid batteries. In addition to their bulk and excessive weight, batteries contain significant amounts of toxic materials such as lead, cadmium, and others. Moreover, batteries are characterized by low energy densities making them poor storage devices, particularly for mobile applications. Unlike conventional batteries, ceramic capacitors are lighter in weight and are generally more environmentally friendly.

Due to the demanding nature of the previously-mentioned applications, and in order to be a commercially viable alternative, a ceramic capacitor is needed that has a high dielectric constant, a high breakdown strength, a low specific gravity, and a low dissipation factor. In other words, the ceramic capacitors must achieve high volumetric efficiency or energy per cubic centimeter, be lightweight, and be capable of being efficiently charged and discharged.

SUMMARY OF THE INVENTION

The present invention provides a batch powder composition for preparing a sintered dielectric ceramic. The batch powder comprises a titanate powder, an optional sintering aid, and an acceptor additive. The titanate powder comprises at least one of $CaTiO_3$, $SrTiO_3$, or $Ca_xSr_{1-x}TiO_3$ where x=0 to 1, and wherein the titanate powder is substantially free of $MgTiO_3$. The batch powder composition may comprise up to about 20 wt. % of the sintering aid based on the total weight of the sintered dielectric ceramic. The sintering aid comprises boron oxide and at least one of zinc oxide, barium oxide, aluminum oxide, lithium oxide, copper oxide, silicon oxide, calcium oxide, strontium oxide, potassium oxide, lithium fluoride, zinc fluoride, or barium fluoride, or combinations thereof or precursors therefor. The sintering aid is adapted to facilitate sintering of the batch powder at temperatures of about 1050° C. or less. The batch powder comprises between about 0.01 wt. % and about 0.1 wt. % of the acceptor additive based on the total weight of the sintered dielectric ceramic. The acceptor additive comprises an oxide of at least one element of manganese, magnesium, chromium, iron, cobalt, gallium, aluminum, or lithium, or combinations thereof or precursor therefor. The acceptor additive is adapted to substitute for titanium in the at least one of $CaTiO_3$, $SrTiO_3$, or $Ca_xSr_{1-x}TiO_3$ and to suppress electrical conductivity in the sintered dielectric ceramic. The titanate powder forms the balance of the batch powder composition.

In another embodiment, the batch powder further comprises between about 0.01 wt. % and about 2.0 wt. % of a donor additive based on the total weight of the sintered dielectric ceramic. The donor additive comprises at least one oxide of niobium, tantalum, tungsten, molybdenum, vanadium, scandium, yttrium, lanthanum, cerium, praseodymium, neodymium, samarium, europium, gadolinium, terbium, dysprosium, holmium, erbium, thulium, ytterbium, or lutetium, or a combination thereof or precursors therefor. The donor additive is adapted to replace titanium, calcium, and/or strontium in the titanate powder and to reduce oxygen mobility in the sintered dielectric ceramic while suppressing grain growth during sintering.

In another embodiment of the invention, the sintered dielectric ceramic comprises a titanate, the optional sintering aid, and the acceptor additive. The titanate comprises at least one of $CaTiO_3$, $SrTiO_3$, or $Ca_xSr_{1-x}TiO_3$ where x=0 to 1, is non-ferroelectric, and is substantially free of $MgTiO_3$. The sintered dielectric ceramic may comprise the sintering aid in an amount up to about 20 wt. %. The acceptor additive is present in the sintered dielectric ceramic in an amount between about 0.01 wt. % and about 0.1 wt. %. The sintered dielectric ceramic is substantially free of bismuth, lead, and cadmium. In another embodiment, the sintered dielectric ceramic comprises the donor additive in an amount of 0.01 wt. % and about 2 wt. %. In each embodiment, the titanate forms the balance of the sintered dielectric ceramic.

In another embodiment of the present invention, a non-ferroelectric sintered dielectric ceramic has a dielectric constant greater than about 165, a dissipation factor of less than about 0.5% measured at 1 kHz, a specific gravity of less than about 5.2, and an average grain size of less than about 1 micron when sintered at about 1050° C. or less. The non-ferroelectric sintered dielectric ceramic consisting essentially of a titanate, an optional sintering aid, an acceptor additive, and an optional donor additive. The titanate comprises at least one of $CaTiO_3$, $SrTiO_3$, or $Ca_xSr_{1-x}TiO_3$ where x=0 to 1. The titanate is substantially free of $MgTiO_3$. The sintering aid may be present in an amount up to about 20 wt. %. The acceptor additive is present in an amount between about 0.01 wt. % and about 0.1 wt. %. The donor additive may be present in an amount up to about 2.0 wt. %. The titanate forms the balance of the sintered dielectric ceramic.

In another embodiment of the present invention, a multilayer ceramic capacitor comprises a first dielectric layer comprising one embodiment of the sintered dielectric ceramic, a second dielectric layer comprising the sintered dielectric ceramic, a first metallic electrode situated between the first dielectric layer and the second dielectric layer, and a second metallic electrode situated on an opposing side of the second dielectric layer. In one embodiment, the first metallic electrode comprises copper. In another embodiment, the first metallic electrode comprises an alloy of nickel and copper.

In yet another embodiment of the present invention, an energy storage device comprises the multilayer ceramic capacitor. A first connection is in electrical communication with at least the first metallic electrode. The first metallic electrode comprises copper or an alloy of nickel and copper. A second connection is in electrical communication with the second metallic electrode. The first and the second connections are adapted to be in electrical communication with additional multilayer ceramic capacitors and are adapted to charge, store, and then supply electrical energy to an electrical device electrically connected thereto.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
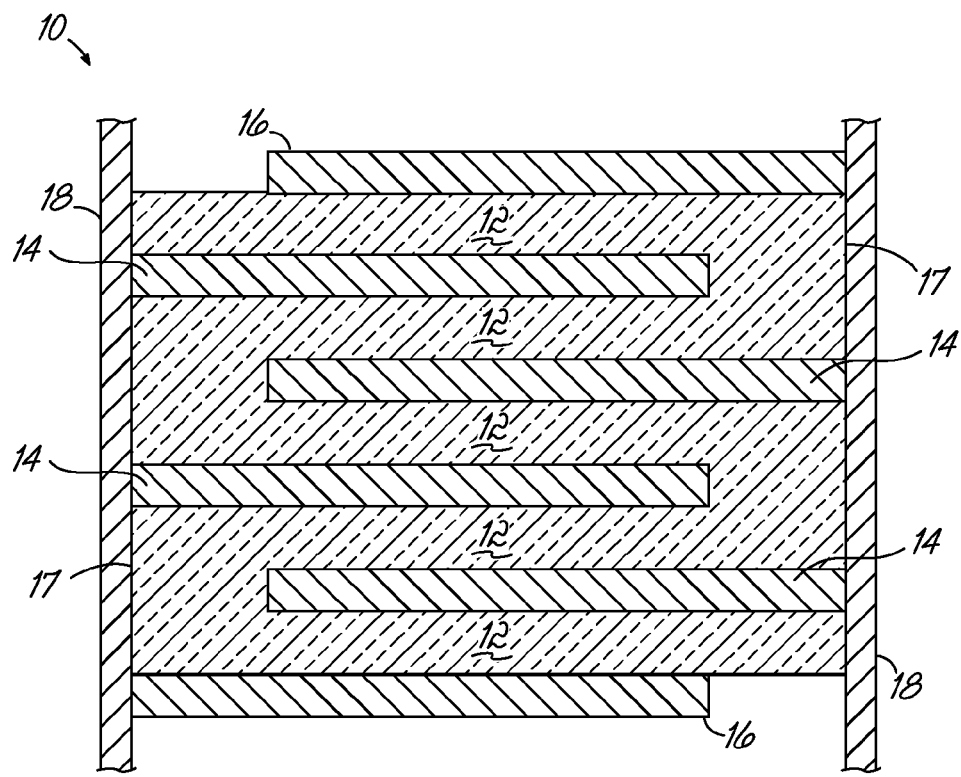
FIG. 1 is a cross-sectional view of one embodiment of a multilayer ceramic capacitor.

The present invention provides a sintered dielectric ceramic suitable for use in a capacitor. Furthermore, multilayer ceramic capacitors, as disclosed herein, may be stacked, aggregated, or otherwise electrically connected for use in energy storage devices such that the devices exhibit performance that surpasses prior art devices. According to the invention disclosed herein, energy storage devices containing the sintered dielectric ceramic have high volume efficiency, are light in weight, and have a low dissipation factor.

As will be described in more detail below, the sintered dielectric ceramic of the invention comprises a titanate selected from at least one of $CaTiO_3$, $SrTiO_3$, or $Ca_xSr_{1-x}TiO_3$, where x=0 to 1. Unlike the prior art, a titanate powder used to prepare the sintered dielectric ceramic of the invention is substantially free of $MgTiO_3$, yet capacitors made with the sintered dielectric ceramic have superior performance. In addition, the constituents of a batch powder of the invention used to prepare the sintered dielectric ceramic of the invention, which constituents are more fully described below, are substantially free of lead, cadmium, and bismuth. Consequently, the sintered dielectric ceramic made therefrom is environmentally friendly from both manufacturing and disposal perspectives. The sintered dielectric ceramic of the invention is characterized by low specific gravity and exhibits a dielectric constant that is much less sensitive to an applied electric field than prior art dielectrics. Furthermore, unlike lead zirconate titanate and lead magnesium niobate dielectric ceramics, for example, the sintered dielectric ceramic of the invention is non-ferroelectric. Accordingly, it is characterized as having a low dissipation factor that advantageously reduces losses during both charging and discharging of a capacitor made of the sintered dielectric ceramic.

To that end, in one embodiment, the sintered dielectric ceramic of the invention is manufactured by sintering a batch powder following the forming thereof into a green preform or other compact. For example, the batch powder may comprise a titanate powder. The titanate powder is selected from at least one of $CaTiO_3$, $SrTiO_3$, or $Ca_xSr_{1-x}TiO_3$, where x=0 to 1. It will be appreciated that mixtures of $CaTiO_3$ and $SrTiO_3$ may form a solid solution, such as $Ca_xSr_{1-x}TiO_3$, where x=0 to 1, when sintered at elevated temperatures. The purity the titanate powder may be at least 99.5% or may be selected to balance the titanate powder cost against the sintered dielectric ceramic's reliability under high voltage. At lower purities, contamination due to silicon oxide, aluminum oxide, sodium oxide, and the like, may degrade the sintered dielectric ceramic's reliability under high voltage. The titanate powder is mixed with an acceptor additive, and optionally, a sintering aid and/or a donor additive, each of which is described below. The titanate powder forms the balance of the batch powder after taking into account the weight percentages the acceptor additive and any sintering aid or donor additive.

The average particle size for the titanate powder should be between about 0.1 μm and about 0.5 μm. If average particle size is less than 0.1 μm, the batch powder may be difficult to process. On the other hand, if average particle size is larger than 0.5 μm, the batch powder may be difficult to sinter. Fine powders of calcium titanate and strontium titanate can be obtained, for example, by chemical precipitation using an oxalate, by hydrothermal processes, by sol-gel processes, or by other routes. Alternatively, the titanate powder may be made by a mixed-oxide route using nano-sized precursor powders of titanium oxide and calcium carbonate, or titanium oxide and strontium carbonate. In another embodiment, the titanate powder may be made by milling micron-sized powders in a bead-mill with small zirconium oxide media (e.g., 1 mm in size or less). Other methods of making nano-sized titanate powders may include flame-spray pyrolysis, a method provided by Nanocerox, Ann Arbor, Mich.

In addition to the titanate powder, as described above, the batch powder optionally comprises a sintering aid in an amount up to about 20 wt. % of the total weight of the sintered dielectric. Depending on the raw materials used as constituents of the sintering aid, the weight percentage of the sintering aid may be more than 20 wt. % in the batch powder, perhaps as high as about 30 wt. %. Sintering aids are known in the art to facilitate solid-state diffusion or liquid-phase sintering of green ceramic bodies at elevated temperature. Sintering aids, as that term is used herein, may be oxides or other materials that when heated to elevated temperature react to facilitate the densification of the green preform of the batch powder. The sintering aid, in the amount described herein, does not substantially reduce the dielectric breakdown voltage of the sintered dielectric ceramic. An amount greater than about 20 wt. % in the sintered dielectric is, however, likely to excessively lower the dielectric constant of a capacitor made therefrom. Further, one skilled in the art will appreciate that the amount of the sintering aid added may depend upon the particle size of the titanate powder and/or the sintering temperature. For example, as the sintering temperature decreases, more sintering aid may be required to achieve a sufficient density. The use of the sintering aid also may be advantageous for larger particle sizes, particularly as the average particle size of the titanate powder approaches about 0.5 μm. By way of example, if a sintering aid is used, it may be present in an amount of about 1 wt. % to about 10 wt. %, and, in a further example, in an amount of about 2 wt. % to about 5 wt. %.

In one embodiment, the sintering aid may be a zinc borate, for example, $2ZnO \cdot BaO \cdot B_2O_3$ as described in U.S. Pat. No. 4,845,062. Other sintering aids may include one or more fluorides, such as lithium fluoride, zinc fluoride, or barium fluoride. The sintering aid may contain a frit or a glassy material that is capable of viscous flow at temperatures within the sintering temperature range, as described below. By way of example, the frit may initially contain boron oxide, silicon oxide, aluminum oxide, calcium oxide, barium oxide, strontium oxide, zinc oxide, lithium oxide, potassium oxide, or copper oxide, or combinations thereof or precursors therefor.

In one embodiment, the sintering aid is prepared by milling a mixture of the constituents or precursors (for example, carbonates or borates) of the sintering aid in isopropanol and then reacting the mixture at elevated temperature to produce the sintering aid. The sintering aid produced thereby may be subsequently bead milled in isopropanol to a particle size of 0.5 microns or less. In one exemplary embodiment, the sintering aid comprising $2ZnO \cdot BaO \cdot B_2O_3$ is prepared by milling a mixture of barium carbonate, zinc oxide, and zinc borate ($2ZnO \cdot B_2O_3 \cdot 3.5H_2O$) in isopropanol and then reacting the mixture at about 700° C. for about 5 hours.

The sintering aid may be mixed with the titanate powder and/or other powders. To that end, in one embodiment, the sintering aid coats the particles of the titanate powder to facilitate uniform sintering of the green preform or compact formed of the batch powder. One exemplary method of coating the titanate powder is to spin coat solutions containing the constituents of the sintering aid onto the titanate powder. The solutions (e.g., water or alcohol based) may contain ions of the sintering aid as described in U.S. Pat. No. 5,011,804. By way of example, and not limitation, soluble salts of zinc and barium, such as acetates or nitrates thereof, may be dissolved in a solvent and then spin coated onto the titanate powder. A boron source may include ammonium tetraborate, which may also be spin coated onto the titanate powder. Once the solution is applied, the coated titanate powder is heated to about 500° C. to decompose the salts and bond the coating to the titanate powder particles. Other techniques for coating the titanate powder may be used to uniformly disperse the sintering aid throughout the titanate powder and thus foster uniform sintering of the titanate powder.

In addition to the titanate powder and the optional sintering aid, both described above, the batch powder comprises an acceptor additive. Not wishing to be bound by theory, the acceptor additive may contain a cation that will substitute for a titanium cation in the titanate crystal lattice during sintering. The acceptor additive commonly exhibits charge valences of less than 4 when bonded to an ion having a relatively large electronegativity, like oxygen. Thus, when the cation from the acceptor additive substitutes into the titanate crystal lattice for the titanium cation (having a commonly accepted valence of +4), the acceptor cation may suppress electrical conductivity through the titanate crystal structure otherwise facilitated by oxygen loss therefrom during sintering in reduced oxygen partial pressure atmospheres, as described below.

In one embodiment, depending on the conditions during sintering, the acceptor additive is added in an amount between about 0.01 wt. % and about 0.1 wt. % of the total weight of the sintered dielectric ceramic. Again, depending on the constituents of the acceptor additive, the amount of the acceptor additive in the batch powder may be more or less than the range provided. It will be appreciated that adding the acceptor additive in an amount greater than 0.1 wt. % may increase the dielectric loss of a capacitor made therefrom. In one exemplary embodiment, the acceptor additive comprises manganese oxide in an amount of about 0.01 wt. %. In other embodiments, the acceptor additive may contain one or more ions of iron, gallium, cobalt, chromium, aluminum, magnesium, or lithium, or combinations thereof. The acceptor additive may be an oxide or oxide precursors therefor. Like the sintering aid, described above, the acceptor additive may be formed as a coating on the titanate powder.

In yet another embodiment, the batch powder may contain a donor additive in an amount up to about 2 wt. % based on the total weight of the sintered dielectric ceramic. As with the sintering aid and the acceptor additive, the amount of the donor additive in the batch powder may vary from the range depending on the constituents thereof. Not wishing to be bound by theory, the donor additive may be added to reduce oxygen mobility in the titanate crystal structure. According to one embodiment, the term donor additive means a substance containing a cation having a valence greater than the titanium cation (+4) when bonded to oxygen and that substitutes for titanium in the crystal lattice. For example, in one embodiment, the donor additive may contain niobium, tantalum, tungsten, molybdenum, or vanadium, or a combination thereof (in the form of an oxide or oxide precursor) to substitute in the titanate lattice for titanium. It will be appreciated that the donor additive may be ions of the above elements added during the manufacture of the titanate powder.

Alternatively, in another embodiment, the term donor additive means a substance containing a cation having a valence greater than calcium (+2) or strontium (+2) and that substitutes in the crystal lattice for one of those cations. For example, in another embodiment, scandium, yttrium, lanthanum, cerium, praseodymium, neodymium, samarium, europium, gadolinium, terbium, dysprosium, holmium, erbium, thulium, ytterbium, or lutetium or combinations thereof (in the form of an oxide or oxide precursor) may substitute for calcium and/or strontium in the titanate lattice. In yet another embodiment, the donor additive comprises niobium, yttrium, dysprosium, holmium, or erbium, or a combination thereof.

The amount of donor additive provided to the batch powder may depend on the purity of all of the powders in the batch powder (i.e., the titanate powder, the acceptor additive, and the sintering aid and the donor additive, if any) used to manufacture the sintered dielectric ceramic. If the powders are highly pure, little or no donor additive may be added. Alternatively, the donor additive may be added to suppress the effects of impurity elements in the powders. For example, the donor additive may be present in an amount of between about 0.1 wt. % and about 2.0 wt. % based on the total weight of the sintered dielectric ceramic, and in a further example, in an amount of about 0.25 to about 1.0 wt. %. The donor additive may also suppress grain growth during sintering, thus facilitating higher breakdown strength of the sintered dielectric ceramic. It may be appreciated that mixing the donor additive into the batch powder in amounts in excess of about 2 wt. % can retard sintering. As with the acceptor additive and sintering aid, the donor additive may be mixed with the titanate powder as oxides or their precursors or coated on the surface of the particles. Alternatively, the donor additive may be admixed with the titanate powders during the manufacturing thereof.

Once the constituents of the batch powder are selected, as described above, the batch powder is mixed to achieve uniform intermixing by methods known to those skilled in the art. In one embodiment, a mixture is achieved by milling the batch powder in a solution containing a volatile organic solvent and a polymeric binder. Suitable volatile organic solvents include, for example, a mixture of butyl or ethyl acetate and ethyl alcohol. The polymeric binder may be one that readily decomposes into a gas in low oxygen partial pressure atmospheres. The polymeric binder may be, for example, a polyvinyl butyral, an acrylate, a polyisobutylene, or a polycarbonate. Furthermore, the binder may also include a plasticizer. The plasticizer may contain dibutyl thalate, oxtyl thalate, or butyl benzyl thalate, for example.

Once mixed, the mixture may be formed or shaped by methods known in the art, such as by tape casting, pressing, extrusion, or other forming methods. For example, tape casting produces a flexible sheet containing the batch powder and the polymeric binder. In one embodiment, the flexible sheet produced by tape casting is from about 1 µm to about 50 µm thick, for example, between about 2 µm and about 25 µm thick. The thickness may depend on, among other parameters, the voltage rating required of the multilayer ceramic capacitor.

Subsequently, after the mixture is tape cast or otherwise formed, an electrode paste is screen printed onto the flexible sheet. By way of example, the electrode paste may contain a metal powder with a maximum particle size of not more than about 1 micron in diameter. In one embodiment, the metal powder comprises a copper powder, such as Cu-505 available from Shoei Company, Tokyo, Japan. While the individual particles of this powder may be coated with a thin film of oxide, the individual particles may be uncoated. The thin oxide may retard oxidation or inhibit grain growth during subsequent sintering of the electrode paste while in contact with the flexible sheet. In another embodiment, the metal powder comprises an alloy of nickel and copper.

The electrode paste may also include an organic binder in a solvent that does not attack the flexible sheet. The organic binders include, for example, ethyl cellulose, n-butyl and other methacrylates, a low molecular weight polyvinyl butyral, a polyalkylene carbonate, or an acrylic binder that can impart shear thinning rheology, such as those available from Sekisui Corporation, Troy, Mich. The solvent may be mineral spirits, terpineol, or carbitol acetate, although other solvents that do not attack the flexible sheet may be used.

In another embodiment, up to about 30 vol. % metal powder may be substituted with an oxide powder. The oxide powder is mixed with the metal powder prior to screen printing the electrode paste onto the flexible sheet. The viscosity and solids content of the electrode paste are adjusted by methods known in the art and then the electrode paste is printed on the flexible sheet. The mixture of oxide and metal powder may match the shrinkage between the electrode formed thereof and the sintered dielectric ceramic formed from the batch powder during sintering. It will be appreciated that the mixture may allow the electrode thickness to be reduced. In one embodiment, the oxide powder is identical to or substantially the same composition as the batch powder for the sintered dielectric ceramic. In another embodiment, the oxide powder is a different composition from the batch powder.

After firing, the electrode is between about 0.25 μm and about 2.0 μm thick, and in a further example, between about 0.5 μm and about 0.75 μm. If the electrodes are thinner than about 0.25 μm, then the electrical conductivity of the electrodes may be compromised. On the other hand, if the electrodes are thicker than about 2.0 μm, the volumetric energy storage efficiency may be reduced for those capacitors having many layers.

Continuing with reference to the tape casting description set forth above, following forming the flexible sheet and printing the electrode paste thereon, a multilayer green stack may be constructed by stacking multiple, individual flexible sheets with electrodes screen printed thereon, upon one another. For example, multiple electrodes of the desired area and separation are printed onto sections of the flexible sheet that measure about 10 cm$^2$ or more. The flexible sheet with screen-printed electrode is dried and then stacked onto other similarly prepared layers. It will be appreciated that the multilayer green stack may then be laminated, which may include an isostatic step. The resulting stack may then be diced into individual, multilayer green assemblies. One skilled in the art will observe and appreciate that one alternative method of constructing the stack may include making a paste of the batch powder and then alternating layers of the electrode paste between layers of the paste of the batch powder on a removable substrate. Further, the stack may be uniaxially or isostatically pressed. Variations on this alternative process may include those described in U.S. Pat. No. 3,717,487. The multilayer green assemblies are then heat treated.

As a portion of their heat treatment, in one embodiment, the assemblies are pre-heated to remove most of the organic material therefrom. This process is often referred to as "bake out" and may require temperatures of between about 250° C. and about 400° C. Furthermore, bake out may occur in air or other atmospheres that facilitate controlled removal of organic material from the assembly. For instance, the atmosphere may contain nitrogen, or a mixture thereof, for example: nitrogen and water vapor; nitrogen, hydrogen, and water vapor; or nitrogen, hydrogen, and carbon dioxide. However, other gas atmospheres may be used that provide a reducing environment. In one exemplary embodiment, bake out occurs in air at about 350° C.

The combination of bake-out temperature and atmosphere is selected so as to maximize removal of the previously added organic binders, solvents, plasticizers, or other volatile compounds. In embodiments with copper and/or nickel metal powder in the electrode paste, the atmosphere and temperature during bake out are also selected to minimize oxidation of the metal powder. Oxidation of the metal powder may damage or destroy the capacitor. For example, oxidation of the metal powder may cause the electrode to expand, and that may cause the adhered dielectric to crack. For this reason, selection of the metal powder may depend upon the atmosphere. For example, copper powder can tolerate higher oxygen levels in the atmosphere during bake out than nickel powders without substantial oxidation. Therefore, copper electrodes may be selected over nickel ones due to improved oxidation performance in certain gas atmospheres.

Following bake out or other binder removal process, the individual multilayer green assemblies are sintered at elevated temperature. Depending on a number of variables, including the particle sizes and the constituents of the batch powder (e.g., the amounts of any sintering aid, the acceptor additive, and any donor additive), the electrode paste, and the atmosphere, the sintering temperature may be in the range from about 1000° C. to about 1050° C. The assemblies may be held in that temperature range from about 1 to about 5 hours or until they are sufficiently dense, e.g., having a specific gravity more than about 98% of the theoretical value. For instance, it is known that $CaTiO_3$ has a specific gravity of about 3.98 and $SrTiO_3$ has a specific gravity of about 5.1 when fully dense.

The sintering temperature is determined at least in part by the composition of the electrode paste. For example, as the sintering temperature exceeds 1050° C., a copper powder in the electrode paste may oxidize or melt, since copper has a melting temperature of 1083° C. Thus, while sintering temperatures of the batch powder may exceed 1050° C., incorporation of copper may limit the highest sintering temperature to less than about 1083° C. The sintering temperature range of about 1000-1050° C. is thus particularly advantageous for copper electrodes, but one skilled in the art may appreciate that the temperature may vary if different metals or alloys are used for the electrodes. The sintering temperature should be below the melting point of the conducting metal in the electrode so as to volatilize any remaining organic medium and to sinter the inorganic materials without melting the conductive metal.

As with bake out, described above, controlling the atmosphere during sintering may prevent or reduce oxidation of the metal powder in the electrode paste. However, the atmosphere may also change the oxygen content of the titanate. In one embodiment, the atmosphere is sufficiently reducing such that oxygen is removed from the titanate structure. Thus, acceptor additives may be added to offset oxygen loss in the titanate crystal structure while substantially preventing the metal in the electrode paste from oxidizing. The sintering atmosphere may be a mixture of nitrogen, hydrogen, and water vapor or carbon dioxide. In one embodiment, the metal powder in the electrode paste is copper and the sintering atmosphere includes nitrogen, hydrogen, and carbon dioxide.

According to a further embodiment, the volume ratio of carbon dioxide to hydrogen is about 50 to 1. An in-situ oxygen sensor may be utilized to monitor the oxygen partial pressure of the atmosphere during sintering thus allowing the oxygen partial pressure to be controlled by varying the volume ratio of gases. An oxygen partial pressure in the furnace in the range of about $10^{-8}$ to about $10^{-10}$ atmospheres may then be maintained.

In another embodiment, the sintered individual multilayer assemblies are hot isostatically pressed, as is known in the art, after they have been sintered. It will be appreciated that hot isostatic pressing removes porosity from the sintered assemblies thereby increasing the breakdown strength of the sintered dielectric ceramic. In one embodiment, hot isostatic pressing takes place at about 1000° C. in an argon atmosphere with about 2,000 atmospheres (200 MPa) of pressure. In another embodiment, hot isostatic pressing takes place between about 100 MPa and about 300 MPa.

In another embodiment, following hot isostatic pressing, the assembly is cooled slowly, for example at about 5° C. per minute. The slow cooling step may permit the sintered dielectric ceramic to react with any oxygen in the surrounding atmosphere. Alternatively, it will be appreciated that other suitable reoxidation processes may include changing the oxygen content in the atmosphere during slow cooling, such as increasing the oxygen partial pressure whereby the sintered dielectric ceramic may react with oxygen without oxidizing the electrodes. Alternatively, in one embodiment, reoxidation may be achieved by heating to a temperature between about 600° C. and about 750° C. in air for between about 1 and about 5 hours.

One embodiment of a multilayer ceramic capacitor 10 made according to the invention described herein is depicted in FIG. 1. The multilayer ceramic capacitor 10 includes two or more dielectric layers 12 comprising the sintered dielectric ceramic discussed above, with one or more internal metallic electrodes 14. In one embodiment, external metallic electrodes 16 are formed on the multilayer ceramic capacitor 10, as shown in FIG. 1. In that figure and by way of example only, five dielectric layers 12 are separated by four internal metallic electrodes 14, and the multilayer ceramic capacitor 10 has two external metallic electrodes 16. It will be appreciated that multilayer capacitors may have hundreds or more alternating layers rather than the multilayer ceramic capacitor 10 shown in FIG. 1.

The metallic electrodes 14, 16 are electrically terminated by methods known in the art (e.g., by applying a metal-containing paste in contact with each electrode 14, 16) to form end terminations 18. The metal-containing paste used for the end terminations 18 may contain any conductive metal. Copper is one commonly used metal. The metal-containing paste may also contain glass powder. The paste is applied to each edge 17 of the multilayer ceramic capacitor 10. In some embodiments, the corners (not shown) of the multilayer ceramic capacitor 10 are machined or milled with a slurry of abrasive powder in water or alcohol and then dried prior to applying the metal-containing paste to the edges 17. The multilayer ceramic capacitor 10 thus prepared is heated to about 750° C. to about 900° C. in nitrogen or other inert atmosphere to bond the metal-containing paste to the edges 17 of the multilayer ceramic capacitor 10 thereby creating the end terminations 18 that provide electrical conduction between metallic electrodes 14, 16 on each edge 17 of the multilayer ceramic capacitor 10. In another embodiment, the corners are rounded before sintering. The electrode paste may then be applied before sintering or after sintering. In another embodiment, the end terminations 18 may be electroplated per industry standard practice with nickel and then with tin to protect the metal, such as copper, from oxidizing should the multilayer ceramic capacitor 10 increase in temperature during operation.

Figure 2:
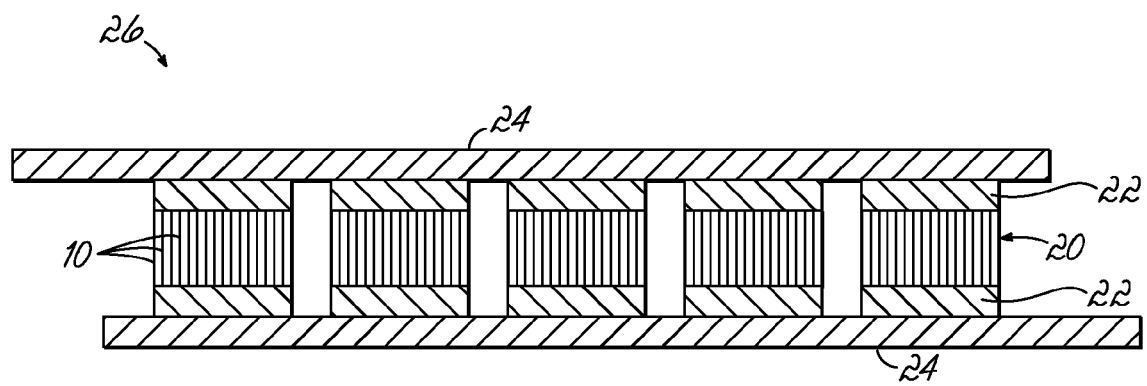
FIG. 2 is a cross-sectional view of one embodiment of an energy storage device.

With reference to FIG. 2, one or more multilayer ceramic capacitors 10 of FIG. 1 may be assembled together or stacked vertically upon one another to form a stack 20. The individual capacitors 10 in each stack 20 may then be electrically connected with opposing electrical connections 22. The electrical connections 22 may be, for example, copper bus bars, silver paste containing a curable polymer, or other conductive material. Additional electrical connections 24 may be used to connect multiple stacks 20 by connecting their electrical connections 22 in parallel, as shown, to form an energy storage device 26, to electrically connect the stacks 20 to an electrical charging source, and to distribute electrical power to other devices.

In order to facilitate a more complete understanding of the invention, the following non-limiting example is provided.

Example 1

An exemplary embodiment of a multilayer ceramic capacitor 10, as disclosed herein, may be made from a batch powder containing a titanate powder of about 50 mol. % calcium titanate and about 50 mol. % strontium titanate. The titanate particles may be coated with about 0.25 wt. % niobium oxide (donor additive), about 0.05 wt. % manganese oxide (acceptor additive), and about 5.0 wt. % barium zinc borate (sintering aid). (All weight percents are based on the total weight of the titanate powder.) The batch powder is first milled in a plastic jar with zirconium oxide media for about 16 hours in solvent such as about 60 vol. % toluene, and about 40 vol. % ethyl alcohol containing a small amount of polyvinyl butyral binder (PVB) (e.g., about 5 wt. % PVB with respect to the weight of the solvent). A binder solution comprising about 16.1 wt. % PVB, about 24.8 wt. % dibutyl thalate plasticizer, and about 59.1 wt. % of the toluene/ethyl alcohol solvent is then added in a ratio of about 30.4 gm of binder solution to about 100 gm of titanate dielectric powder and milled for about 5 hours. The mix is then tape cast into a flexible green sheet. A copper-containing electrode paste is screen printed onto the flexible sheet. Following stacking, lamination, and dicing, the individual assemblies may be subject to bake out at a temperature of 350° C. and then sintered at a sintering temperature of about 1050° C. in an atmosphere comprising nitrogen, hydrogen, and carbon dioxide such that the oxygen partial pressure is about $10^{-9}$ atmospheres. Following sintering, the individual assemblies may then be additionally hot isostatically pressed at a pressure of about 200 MPa and at a temperature of about 1000° C. in argon. As a result, the average grain size of the sintered dielectric ceramic may be less than 1 micron. The multilayer ceramic capacitor is expected to have the following characteristics.

Capacitance

Area of the capacitor (after sintering)=6.25 $cm^2$

Margin widths of capacitor (i.e., the width of ceramic between the edges of the capacitor and the ends of the internal electrodes)=0.15 cm Electrode plate area (after sintering), A=5.70 $cm^2$=5.70×$10^{-4}$ $m^2$ Sintered dielectric ceramic layer thickness (after sintering and hot isostatic pressing) t=5 μm=5×10$^{-6}$ m
Dielectric constant with voltage applied, K=200
Number (N) of dielectric layers needed for 100 μF=100×10$^{-6}$ F capacitor, with applied $$\text{voltage} = \frac{C \cdot t}{A \cdot K \cdot \varepsilon_0} = \frac{100 \times 10^{-6} \cdot 5 \times 10^{-6}}{5.7 \times 10^{-4} \cdot 200 \cdot 8.8854 \times 10^{-12}} = 495$$

Volume
Total sintered dielectric ceramic thickness=495·5 μm=0.248 cm
Electrode thickness=0.75 μm
Total electrode thickness=0.75 μm·496=0.037 cm
Cover layer thickness (i.e., the thickness of ceramic without electrodes on the top and bottom of the capacitor): 20 dielectric layers=20·5 μm=100 μm
Total cover layer thickness=2·100 μm=200 μm=0.020 cm
Total thickness=0.248 cm+0.037 cm+0.02 cm=0.305 cm
Total volume=6.25 cm$^2$~0.305 cm=1.91 cm$^3$
Energy Density
Breakdown voltage=750 V
Maximum operating voltage, E=500 V (1 MV/cm)
Energy storage=½ CE$^2$=100×10$^{-6}$ F·(500V)$^2$=12.5 Joules
Energy density=12.5/1.91=6.5 J/cm$^3$ According to the invention disclosed herein, the sintered dielectric ceramic may be characterized as having a dissipation factor of less than about 0.5% when measured at 1 kHz with an applied voltage of 1 V, a dielectric constant greater than about 165 when an electric field of 0.5 MV/cm is applied, a specific gravity of not more than about 5.2 g/cc, and an average grain size of less than about 1 μm when sintered at about 1050° C. or less. The multilayer ceramic capacitors made of the sintered dielectric ceramic have base-metal conductors and may be characterized as having an energy storage capability (energy density) higher than about 5 J/cc. Furthermore, the multilayer ceramic capacitor is substantially free of lead oxide, cadmium oxide, and bismuth oxide.

In one embodiment, the sintered dielectric ceramic consists essentially of a titanate, the optional sintering aid, the acceptor additive, and the optional donor additive. The titanate comprises at least one of CaTiO$_3$, SrTiO$_3$, or Ca$_x$Sr$_{1-x}$TiO$_3$ where x=0 to 1. The titanate is non-ferroelectric and is substantially free of MgTiO$_3$. The sintering aid is optionally present in an amount up to about 20 wt. %. The acceptor additive is present in an amount between about 0.01 and about 0.1 wt. %. The donor additive is optionally present in an amount up to about 2 wt. %, for example, between about 0.25 wt. % and about 1 wt. %. As used herein, "consisting essentially of" means that no other elements are intentionally added to the sintered dielectric ceramic. However, impurity content of other elements from the raw materials or the fabrication process may be contemplated.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative products and illustrative examples shown and described. Accordingly, departures may be made from such details without departing from the scope of the general inventive concept.

What is claimed is:

1. A sintered dielectric ceramic formed from a batch powder comprising:
 a titanate comprising at least one of CaTiO$_3$, SrTiO$_3$, or Ca$_x$Sr$_{1-x}$TiO$_3$ where x=0 to 1, wherein the titanate is non-ferroelectric and is substantially free of MgTiO$_3$;
 a sintering aid in an amount greater than 0 wt. % up to about 20 wt. %, comprising boron oxide and at least one of zinc oxide, barium oxide, aluminum oxide, lithium oxide, copper oxide, silicon oxide, calcium oxide, strontium oxide, potassium oxide, lithium fluoride, zinc fluoride, or barium fluoride, or combinations thereof, wherein the sintering aid is adapted to facilitate sintering at temperatures of about 1050° C. or less; and
 an acceptor additive in the form of an oxide or oxide precursor and comprising at least one cation of manganese, magnesium, chromium, iron, cobalt, gallium, aluminum, or lithium, or combinations thereof and being present in an amount of between about 0.01 wt. % and about 0.1 wt. %, the cation of the acceptor additive substituting for titanium in the at least one of CaTiO$_3$, SrTiO$_3$, or Ca$_x$Sr$_{1-x}$TiO$_3$ to suppress electrical conductivity in the sintered dielectric ceramic;
 wherein the titanate forms the balance of the ceramic; and
 wherein the sintered dielectric ceramic is substantially free of bismuth, lead, and cadmium.

2. The sintered dielectric ceramic of claim 1, wherein the batch powder further comprises:
 a donor additive in the form of an oxide or oxide precursor and comprising at least one cation of niobium, tantalum, tungsten, molybdenum, vanadium, scandium, yttrium, lanthanum, cerium, praseodymium, neodymium, samarium, europium, gadolinium, terbium, dysprosium, holmium, erbium, thulium, ytterbium, or lutetium, or combinations thereof and being present in an amount between about 0.01 wt. % and about 2 wt. %, the cation of the donor additive substituting for titanium, calcium, and/or strontium in the at least one of CaTiO$_3$, SrTiO$_3$, or Ca$_x$Sr$_{1-x}$TiO$_3$ to reduce oxygen mobility in the sintered dielectric ceramic while suppressing grain growth during sintering.

3. The sintered dielectric ceramic of claim 1, wherein the batch powder further comprises:
 a donor additive in the form of an oxide or oxide precursor and comprising at least one cation of scandium, yttrium, lanthanum, cerium, praseodymium, neodymium, samarium, europium, gadolinium, terbium, dysprosium, holmium, erbium, thulium, ytterbium, or lutetium, or combinations thereof and being present in an amount between about 0.01 wt. % and about 2 wt. % based on the oxide of the at least one cation, the cation of the donor additive substituting for calcium and/or strontium in the at least one of CaTiO$_3$, SrTiO$_3$, or Ca$_x$Sr$_{1-x}$TiO$_3$ to reduce oxygen mobility in the sintered dielectric ceramic while suppressing grain growth during sintering.

4. The sintered dielectric ceramic of claim 1, wherein the batch powder further comprises:
 a donor additive in the form of an oxide or oxide precursor and comprising at least one cation of niobium, yttrium, dysprosium, holmium, or erbium, or combinations thereof and being present in an amount of between about 0.1 wt. % and about 2 wt. %, the cation of the donor additive substituting for calcium and/or strontium in the at least one of CaTiO$_3$, SrTiO$_3$, or Ca$_x$Sr$_{1-x}$TiO$_3$ to reduce oxygen mobility in the sintered dielectric ceramic while suppressing grain growth during sintering.

5. The sintered dielectric ceramic of claim 4 wherein the donor additive is present in an amount of between about 0.25 wt. % and about 1.0 wt. %.

6. The sintered dielectric ceramic of claim 1 wherein the sintering aid consists essentially of boron oxide, barium oxide, and zinc oxide.

7. The sintered dielectric ceramic of claim 1 wherein the sintering aid is present in an amount between about 1 wt. % and about 10 wt. %.

8. The sintered dielectric ceramic of claim 1 wherein the titanate is present in an amount between about 79.9 wt. % and about 99.9 wt. %.

9. A non-ferroelectric sintered dielectric ceramic having a dielectric constant greater than about 165, a dissipation factor of less than about 0.5% measured at 1 kHz, a specific gravity of less than about 5.2, and an average grain size of less than about 1 micron when sintered at about 1050° C. or less, the non-ferroelectric sintered dielectric ceramic formed from a batch powder consisting essentially of:
a titanate comprising at least one of $CaTiO_3$, $SrTiO_3$, or $Ca_xSr_{1-x}TiO_3$ where x=0 to 1, wherein the titanate is substantially free of $MgTiO_3$;
a sintering aid in an amount greater than 0 wt. % up to about 20 wt. %, comprising boron oxide and at least one of zinc oxide, barium oxide, aluminum oxide, lithium oxide, copper oxide, silicon oxide, calcium oxide, strontium oxide, potassium oxide, lithium fluoride, zinc fluoride, or barium fluoride, or combinations thereof, the sintering aid adapted to facilitate sintering at temperatures of about 1050° C. or less;
an acceptor additive in the form of an oxide or oxide precursor and comprising at least one cation of manganese, magnesium, chromium, iron, cobalt, gallium, aluminum, or lithium, or combinations thereof and being present in an amount between about 0.01 wt. % and about 0.1 wt. %, the cation of the acceptor additive substituting for titanium in the at least one of $CaTiO_3$, $SrTiO_3$, or $Ca_xSr_{1-x}TiO_3$ to suppress electrical conductivity in the sintered dielectric ceramic; and
a donor additive in the form of an oxide or oxide precursor and comprising at least one cation of niobium, tantalum, tungsten, molybdenum, vanadium, scandium, yttrium, lanthanum, cerium, praseodymium, neodymium, samarium, europium, gadolinium, terbium, dysprosium, holmium, erbium, thulium, ytterbium, or lutetium, or combinations thereof and being present in an amount up to about 2.0 wt. %, the cation of the donor additive substituting for titanium, calcium, and/or strontium in the at least one of $CaTiO_3$, $SrTiO_3$, or $Ca_xSr_{1-x}TiO_3$ to reduce oxygen mobility in the sintered dielectric ceramic while suppressing grain growth during sintering,
wherein the titanate forms the balance of the sintered dielectric ceramic.

10. The sintered dielectric ceramic of claim 9 wherein the sintering aid is present in an amount between about 1.0 wt. % and about 10 wt. %.

11. The sintered dielectric ceramic of claim 9 wherein the donor additive is present in an amount between about 0.25 wt. % and about 1.0 wt. %.

12. The sintered dielectric ceramic of claim 9 wherein the titanate is present in an amount between about 77.9 wt. % and about 99.9 wt. %.

13. The sintered dielectric ceramic of claim 9 wherein the sintering aid comprises boron oxide and at least one oxide of zinc or barium or combinations thereof, the acceptor additive comprises manganese oxide, and the donor additive comprises at least one oxide of niobium, yttrium, dysprosium, holmium, or erbium, or a combination thereof.

14. A multilayer ceramic capacitor comprising:
a first dielectric layer comprising a sintered dielectric ceramic;
a second dielectric layer comprising the sintered dielectric ceramic;
a first metallic electrode situated between the first dielectric layer and the second dielectric layer; and
a second metallic electrode situated on an opposing side of the second dielectric layer from the first metallic electrode,
wherein the sintered dielectric ceramic is formed from a batch powder comprising:
(i) a titanate comprising at least one of $CaTiO_3$, $SrTiO_3$, or $Ca_xSr_{1-x}TiO_3$, where x=0 to 1, wherein the titanate is non-ferroelectric and is substantially free of $MgTiO_3$;
(ii) a sintering aid in an amount greater than 0 wt. % up to about 20 wt. %, comprising boron oxide and at least one of zinc oxide, barium oxide, aluminum oxide, lithium oxide, copper oxide, silicon oxide, calcium oxide, strontium oxide, potassium oxide, lithium fluoride, zinc fluoride, or barium fluoride, or combinations thereof, wherein the sintering aid is adapted to facilitate sintering at temperatures of about 1050° C. or less;
(iii) an acceptor additive in the form of an oxide or oxide precursor and comprising at least one cation of manganese, magnesium, chromium, iron, cobalt, gallium, aluminum, or lithium, or combinations thereof and being present in an amount of between about 0.01 wt. % and about 0.1 wt. %, the cation of the acceptor additive substituting for titanium in the at least one of $CaTiO_3$, $SrTiO_3$, or $Ca_xSr_{1-x}TiO_3$ to suppress electrical conductivity in the sintered dielectric ceramic; and
(iv) a donor additive in the form of an oxide or oxide precursor and comprising at least one cation of niobium, tantalum, tungsten, molybdenum, vanadium, scandium, yttrium, lanthanum, cerium, praseodymium, neodymium, samarium, europium, gadolinium, terbium, dysprosium, holmium, erbium, thulium, ytterbium, or lutetium, or combinations thereof and being present in an amount up to about 2 wt. %, the cation of the donor additive substituting for titanium, calcium, and/or strontium in the at least one of $CaTiO_3$, $SrTiO_3$, or $Ca_xSr_{1-x}TiO_3$ to reduce oxygen mobility in the sintered dielectric ceramic while suppressing grain growth during sintering; and
wherein the titanate forms the balance of the sintered dielectric ceramic and the sintered dielectric ceramic is substantially free of bismuth, lead, and cadmium.

15. The ceramic capacitor of claim 14 wherein the first metallic electrode comprises copper.

16. The ceramic capacitor of claim 14 wherein the first metallic electrode further comprises an oxide.

17. The ceramic capacitor of claim 16 wherein the oxide in the first metallic electrode comprises the sintered dielectric ceramic.

18. The ceramic capacitor of claim 14 wherein the first metallic electrode is between about 0.5 and about 2.0 microns thick.

19. The ceramic capacitor of claim 14 wherein the first metallic electrode comprises an alloy of nickel and copper.

20. An energy storage device comprising:
the multilayer ceramic capacitor of claim 14 wherein the first metallic electrode comprises copper or an alloy of nickel and copper;
a first connection in electrical communication with at least the first metallic electrode; and
a second connection in electrical communication with the second metallic electrode, wherein the first and the second connections are adapted to be in electrical communication with additional multilayer ceramic capacitors and are adapted to charge, store, and then supply electrical energy to an electrical device electrically connected thereto.

21. A sintered dielectric ceramic formed from a batch powder comprising:
a titanate comprising at least one of $CaTiO_3$, $SrTiO_3$, or $Ca_xSr_{1-x}TiO_3$ where x=0 to 1, wherein the titanate is non-ferroelectric and is substantially free of $MgTiO_3$;
a sintering aid in an amount up to about 20 wt. %, comprising boron oxide and at least one of zinc oxide, barium oxide, aluminum oxide, lithium oxide, copper oxide, silicon oxide, calcium oxide, strontium oxide, potassium oxide, lithium fluoride, zinc fluoride, or barium fluoride, or combinations thereof, wherein the sintering aid is adapted to facilitate sintering at temperatures of about 1050° C. or less;
a donor additive in the form of an oxide or oxide precursor and comprising at least one cation of niobium, tantalum, tungsten, molybdenum, or vanadium, or combinations thereof and being present in an amount between about 0.01 wt. % and about 2 wt. %, the cation of the donor additive substituting for titanium in the at least one of $CaTiO_3$, $SrTiO_3$, or $Ca_xSr_{1-x}TiO_3$ to reduce oxygen mobility in the sintered dielectric ceramic while suppressing grain growth during sintering; and
an acceptor additive in the form of an oxide or oxide precursor and comprising at least one cation of manganese, magnesium, chromium, iron, cobalt, gallium, aluminum, or lithium, or combinations thereof and being present in an amount of between about 0.01 wt. % and about 0.1 wt. %, the cation of the acceptor additive substituting for titanium in the at least one of $CaTiO_3$, $SrTiO_3$, or $Ca_xSr_{1-x}TiO_3$ to suppress electrical conductivity in the sintered dielectric ceramic;
wherein the titanate forms the balance of the ceramic; and
wherein the sintered dielectric ceramic is substantially free of bismuth, lead, and cadmium.

22. The sintered dielectric ceramic of claim 21 wherein the donor additive is present in an amount of between about 0.25 wt. % and about 1.0 wt. %.

23. The sintered dielectric ceramic of claim 21 wherein the sintering aid consists essentially of boron oxide, barium oxide, and zinc oxide.

24. The sintered dielectric ceramic of claim 21 wherein the sintering aid is present in an amount between about 1 wt. % and about 10 wt. %.

25. The sintered dielectric ceramic of claim 21 wherein the titanate is present in an amount between about 79.9 wt. % and about 99.9 wt. %.

26. A multilayer ceramic capacitor comprising:
a first dielectric layer comprising a sintered dielectric ceramic;
a second dielectric layer comprising the sintered dielectric ceramic;
a first metallic electrode situated between the first dielectric layer and the second dielectric layer; and
a second metallic electrode situated on an opposing side of the second dielectric layer from the first metallic electrode,
wherein the sintered dielectric ceramic is formed from a batch powder comprising:
(i) a titanate comprising at least one of $CaTiO_3$, $SrTiO_3$, or $Ca_xSr_{1-x}TiO_3$, where x=0 to 1, wherein the titanate is non-ferroelectric and is substantially free of $MgTiO_3$;
(ii) a sintering aid in an amount up to about 20 wt. %, comprising boron oxide and at least one of zinc oxide, barium oxide, aluminum oxide, lithium oxide, copper oxide, silicon oxide, calcium oxide, strontium oxide, potassium oxide, lithium fluoride, zinc fluoride, or barium fluoride, or combinations thereof, wherein the sintering aid is adapted to facilitate sintering at temperatures of about 1050° C. or less
(iii) an acceptor additive in the form of an oxide or oxide precursor and comprising at least one cation of manganese, magnesium, chromium, iron, cobalt, gallium, aluminum, or lithium, or combinations thereof and being present in an amount of between about 0.01 wt. % and about 0.1 wt. %, the cation of the acceptor additive substituting for titanium in the at least one of $CaTiO_3$, $SrTiO_3$, or $Ca_xSr_{1-x}TiO_3$ to suppress electrical conductivity in the sintered dielectric ceramic; and
(iv) a donor additive in the form of an oxide or oxide precursor and comprising at least one cation of niobium, tantalum, tungsten, molybdenum, or vanadium, or combinations thereof and being present in an amount between about 0.01 wt. % and about 2 wt. %, the cation of the donor additive substituting for titanium in the at least one of $CaTiO_3$, $SrTiO_3$, or $Ca_xSr_{1-x}TiO_3$ to reduce oxygen mobility in the sintered dielectric ceramic while suppressing grain growth during sintering; and
wherein the titanate forms the balance of the sintered dielectric ceramic and the sintered dielectric ceramic is substantially free of bismuth, lead, and cadmium.

27. The ceramic capacitor of claim 26 wherein the sintered dielectric ceramic further comprises:
a sintering aid in an amount greater than 0 wt. % up to about 20 wt. %, comprising boron oxide and at least one of zinc oxide, barium oxide, aluminum oxide, lithium oxide, copper oxide, silicon oxide, calcium oxide, strontium oxide, potassium oxide, lithium fluoride, zinc fluoride, or barium fluoride, or combinations thereof, the sintering aid adapted to facilitate sintering at temperatures of about 1050° C. or less.

28. The ceramic capacitor of claim 26 wherein the first metallic electrode comprises copper.

29. The ceramic capacitor of claim 26 wherein the first metallic electrode further comprises an oxide.

30. The ceramic capacitor of claim 29 wherein the oxide in the first metallic electrode comprises the sintered dielectric ceramic.

31. The ceramic capacitor of claim 26 wherein the first metallic electrode is between about 0.5 and about 2.0 microns thick.

32. The ceramic capacitor of claim 26 wherein the first metallic electrode comprises an alloy of nickel and copper.

33. An energy storage device comprising:
the multilayer ceramic capacitor of claim 26 wherein the first metallic electrode comprises copper or an alloy of nickel and copper;

a first connection in electrical communication with at least the first metallic electrode; and a second connection in electrical communication with the second metallic electrode, wherein the first and the second connections are adapted to be in electrical communication with additional multilayer ceramic capacitors and are adapted to charge, store, and then supply electrical energy to an electrical device electrically connected thereto.

* * * * *